J. B. HEGAR.
DEMOUNTABLE RING.
APPLICATION FILED FEB. 7, 1917.
1,403,777.
Patented Jan. 17, 1922.
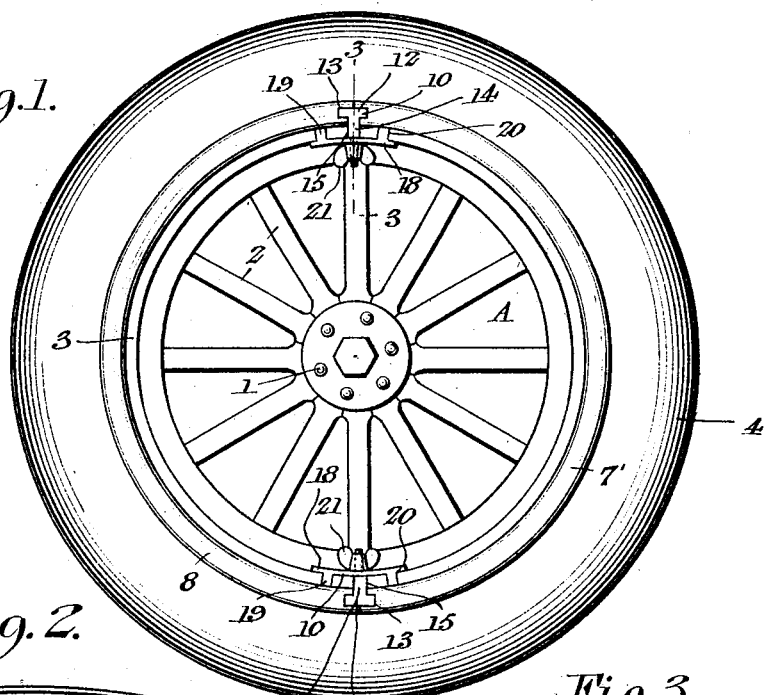
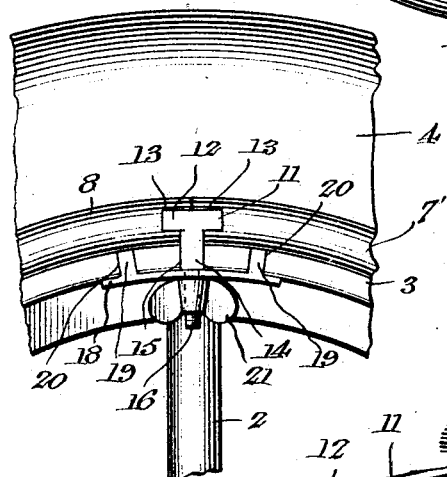
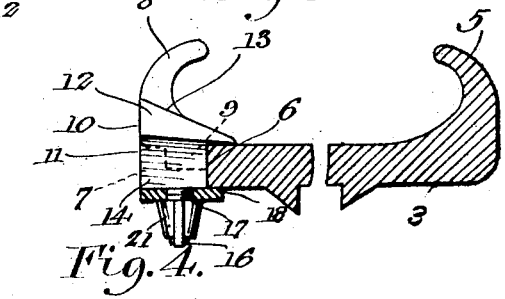
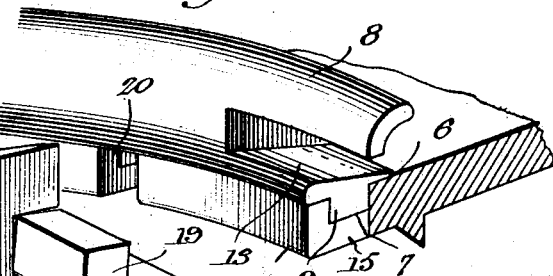
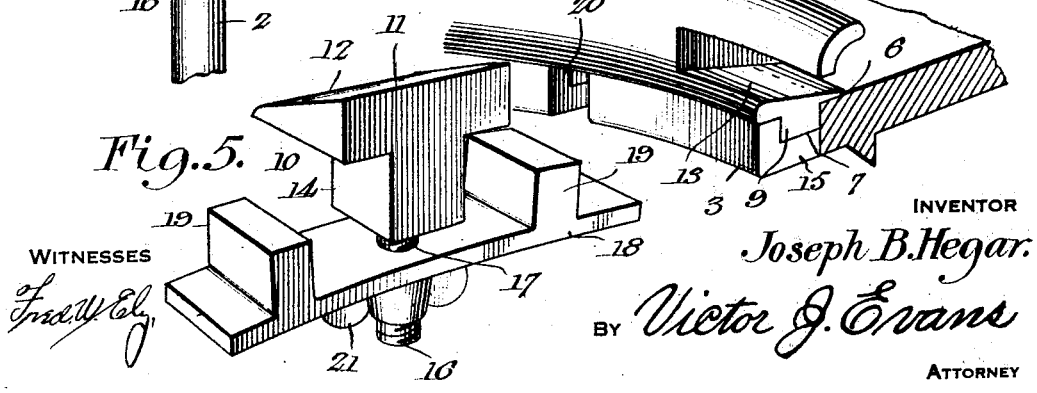
INVENTOR
Joseph B. Hegar.
WITNESSES
BY Victor J. Evans
ATTORNEY

UNITED STATES PATENT OFFICE.

JOSEPH B. HEGAR, OF PHILADELPHIA, PENNSYLVANIA.

DEMOUNTABLE RING.

1,403,777.  Specification of Letters Patent.  Patented Jan. 17, 1922.

Application filed February 7, 1917. Serial No. 147,182.

*To all whom it may concern:*

Be it known that I, JOSEPH B. HEGAR, a citizen of the United States, residing at 2015 Sansom Street, Philadelphia, in the county of Philadelphia and State of Pennsylvania, have invented new and useful Improvements in Demountable Rings, of which the following is a specification.

This invention relates to improvements in the construction of vehicle wheels, and has particular reference to wheels with which pneumatic and similar resilient tires are associated.

The primary object of the invention resides in a tire-carrying vehicle wheel, wherein is provided novel and improved features of construction for conveniently effecting the removal of a tire from the rim of the wheel, and to likewise facilitate the positioning of a tire upon said rim.

Another object resides in the structural simplification of vehicle wheels having removable tire-securing elements, whereby through the use of the present invention, the tires will be capable of being more expeditiously and conveniently positioned upon the rim while in an inflated or noninflated condition, than has hitherto been possible, and to be securely retained in operative relation with the wheel by a simple manipulation of a novel form of locking mechanism.

A further object rests in means of the above character which will be positive and reliable in operation, not likely to rust or to become out of order, simple and efficient in construction, and capable of being economically manufactured.

Other objects will be in part obvious and in part pointed out hereinafter.

In the drawings:

Figure 1 is a side elevation of a vehicle wheel equipped with the removable tire-retaining ring sections, and the co-operating locking mechanism therewith.

Figure 2 is a fragmentary side elevation on an enlarged scale of the ring sections and their associated parts.

Figure 3 is a transverse sectional view taken on the line 3—3 of Figure 1.

Figure 4 is a detail perspective view of the wheel rim, disclosing one of the ring sections applied thereto, and Figure 5 is a detail perspective view of one of the ring-locking devices.

Similar characters of reference denote corresponding parts throughout the several views of the drawing.

Referring more particularly to the drawing, the invention is preferably used in connection with a vehicle wheel A, which includes the usual hub 1, radiating spokes 2, tire-receiving rim 3, and a pneumatic or other tire 4. The rim 3 is provided with an integral and permanent tire-engaging flange 5 on one side thereof, while its opposite edge 6 has a similar flange omitted, but is provided with an annular channel or groove 7, extending around the edge 6. By this construction it will be evident that the tire 4 may be passed over the edge 6 until it contacts with the flange 5, and is securely seated upon the rim 3, this being easily performed without necessarily resorting to the use of tools or the like, and independenently of the condition of the tire.

In order to retain the tire in its operative position upon the rim 3, the invention comprises the provision of a plurality of removable tire-gripping ring sections 7 and 8, preferably formed from resilient metal, and of semi-circular contour. The sections are provided with depending tongue portions 9, which are adapted to fit within the channel 7 so as to position the sections in relatively secured relation with the rim 3. When initially positioning the ring sections upon the rim, the same are slightly bowed to permit the tongues 9 to pass over the edge 6 of the rim. Then upon being centered with the channel, the tongues, by the inherent resilient action of the rings, will contract within the channel and will be securely positioned, free from the possibility of accidental displacement. Thus it will be apparent that the rings may be applied to the wheel by a simple lateral movement, effected by an exceedingly convenient method. Through the cross sectional contour of the flange 5 and the ring sections 7 and 8, the beads of the tire will be securely gripped, whereby it will be impossible for the tire to become disengaged with the wheel, while said sections are disposed within the groove or channel 7.

In order to lock the rim sections in fixed relation with the rim 3, and to prevent the same from creeping circumferentially around the latter, or from becoming accidentally extricated from operative connection with said rim, the invention utilizes a plurality of locking elements 10. The latter, in their preferred form, consist of a plurality of peculiarly formed bolts 11, which are substantially "T" shaped in elevation, being provided with enlarged beveled heads 12, which are adapted to be positioned within similarly formed sockets 13 formed in the adjoining extremities of the ring sections 7 and 8. The heads 12 terminate in body extremities 14, which are adapted to lie within substantially square recesses 15 formed in the edge 6 of the rim 3. The extensions 14 are provided with threaded shanks 16, which normally extend toward the hub 1 of the wheel A, as shown in Figure 1, said shanks pass through openings 17 centrally formed in metallic plates 18, which normally lie contiguous to the under side of the rim 3. The plates 18 are provided with integral lug projections 19, which fit into slots 20 provided in the outer edge of said rim, said projections being utilized to prevent the plates from moving laterally with respect to the rim 3. Winged nuts, or other equivalents, 21 are threaded upon the shanks 16 and are adapted to bear against the underfaces of the plates 18 so as to tensely strain the bolts 11, whereby the ring sections 7 and 8 will be frictionally retained in secured and interlocked relation with the rim 3, in a clearly obvious manner.

Thus, in order to remove the tire 4 from its position upon the rim 3, all that is necessary to be accomplished is to remove the nuts 21 from close frictional engagement with the plates 18. This will permit the locking elements 10 to be bodily withdrawn from engagement with the rim and the ring sections, whereby the latter may be readily removed from engagement with the rim, and the tire 4 may be then conveniently removed from its position upon the wheel.

From the foregoing it will be seen that there is provided a device in which the objects of the present invention have been achieved, and that all of the advantageous features mentioned are, among others, present. The device is exceedingly simple in construction, strong and durable and will not be likely to rust or to otherwise become out of order, so that difficulty will be encountered in successfully effecting its operation.

Having described the invention what is claimed as new and patentable is:

The combination with a tire-supporting rim provided with an integral tire-engaging flange on one side thereof, having an annular groove extending around the opposite edge thereof and provided with spaced slots, of a plurality of removable tire-gripping ring sections of semi-circular contour provided with sockets in the opposite ends thereof, depending tongues extending from said sections engaging said annular groove and provided with slots adjacent to the ends thereof, a pair of metallic plates provided with openings, spaced lugs projecting from one side of said plates and adapted to engage the slots in the rim and said tongues, a pair of T-shaped bolts extending through the said openings in said plates, provided with enlarged beveled heads adapted to engage the sockets formed in the opposite ends of the tire-gripping ring sections, and a pair of winged nuts mounted on said bolts and engaging opposite sides of said plates.

In testimony whereof I affix my signature.

JOSEPH B. HEGAR.